United States Patent
Ledvina et al.

(10) Patent No.: US 7,048,665 B2
(45) Date of Patent: May 23, 2006

(54) POWER TRANSMISSION CHAIN HAVING LINKS WITH LATERAL SPACING ELEMENTS

(75) Inventors: Tim J. Ledvina, Groton, NY (US); Dennis J. Bubel, Ithaca, NY (US); Mark E. Michaels, Homer, NY (US); Mark A. Giovannini, Seneca Falls, NY (US); Roger P. Butterfield, Trumansburg, NY (US)

(73) Assignee: BorgWarner Inc., Auburn Hills, MI (US)

( * ) Notice: Subject to any disclaimer, the term of this patent is extended or adjusted under 35 U.S.C. 154(b) by 98 days.

(21) Appl. No.: 10/447,787

(22) Filed: May 29, 2003

(65) Prior Publication Data

US 2003/0236145 A1 Dec. 25, 2003

Related U.S. Application Data

(60) Continuation-in-part of application No. 10/132,485, filed on Apr. 25, 2002, now Pat. No. 6,595,882, which is a division of application No. 09/506,349, filed on Feb. 17, 2000, now Pat. No. 6,406,394.

(60) Provisional application No. 60/131,413, filed on Apr. 28, 1999.

(51) Int. Cl.
*F16G 13/04* (2006.01)
*F16G 13/02* (2006.01)

(52) U.S. Cl. ...................... 474/212; 474/231

(58) Field of Classification Search .......... 474/212–18, 474/202
See application file for complete search history.

(56) References Cited

U.S. PATENT DOCUMENTS

| | | | | |
|---|---|---|---|---|
| 1,004,389 A | * | 9/1911 | Dodge | 474/213 |
| 1,352,017 A | * | 9/1920 | Morse | 474/213 |
| 1,704,279 A | * | 3/1929 | Breer | 474/213 |
| 1,727,129 A | * | 9/1929 | Morse | 474/213 |
| 3,068,712 A | | 12/1962 | Kuntzmann | 74/255 |
| 3,246,734 A | | 4/1966 | Carvallo | 198/189 |
| 3,620,094 A | | 11/1971 | Ivashkov et al. | 74/251 |
| 3,877,688 A | * | 4/1975 | McCarty | 267/159 |
| 4,094,515 A | | 6/1978 | Araya et al. | 277/92 |
| 4,345,904 A | | 8/1982 | Numazawa et al. | 474/215 |
| 4,494,945 A | | 1/1985 | Ogino | 474/231 |
| 4,580,999 A | | 4/1986 | Ledford | 474/201 |
| 4,758,209 A | | 7/1988 | Ledvina | 474/156 |

(Continued)

FOREIGN PATENT DOCUMENTS

EP 1050697 11/2000

(Continued)

*Primary Examiner*—Roger Pang
(74) *Attorney, Agent, or Firm*—Brown & Michaels, PC; Greg Dziegielewski

(57) ABSTRACT

A chain having a plurality of inside links and guide links. The plurality of inside links each have a pair of apertures and are interleaved and connected to form rows. The plurality of guide links each have a pair of apertures and are placed outside of alternate rows of interleaved inside links to form guide rows. Connecting pins are received in the apertures and extend across the rows of the chain securing the links together. Spacing elements are found on opposite side of the chain, specifically between the guide links and the adjacent outermost inside links. The spacing elements act to maintain a spaced relationship between each of the guide link sand adjacent outermost inside links. At least one of the spacing elements on one side of the chain is a spring link holding the inside links in compressive frictional contact therebetween.

17 Claims, 11 Drawing Sheets

U.S. PATENT DOCUMENTS

| | | | |
|---|---|---|---|
| 4,911,682 A | 3/1990 | Ivey et al. | 474/245 |
| 4,943,266 A | 7/1990 | Mott | 474/201 |
| 5,061,226 A | 10/1991 | Mott | 474/244 |
| 5,114,384 A | 5/1992 | Tsuyama | 474/212 |
| 5,151,066 A | 9/1992 | Wu | 474/206 |
| 5,176,584 A | 1/1993 | Ishida et al. | 474/206 |
| 5,192,252 A | 3/1993 | Skurka et al. | 474/210 |
| 5,318,485 A | 6/1994 | Bateman | 474/245 |
| 5,345,753 A | 9/1994 | Okuda et al. | 474/213 |
| 5,372,554 A | 12/1994 | Okuda | 474/206 |
| 5,409,424 A | 4/1995 | Okuwaki et al. | 474/212 |
| 5,435,789 A | 7/1995 | Avramidis | 474/206 |
| 5,439,423 A | 8/1995 | Okuwaki et al. | 474/245 |
| 5,445,570 A | 8/1995 | White | 474/213 |
| 5,645,503 A | 7/1997 | Okuda et al. | 474/214 |
| 5,651,746 A | 7/1997 | Okuda | 474/215 |
| 6,494,800 B1 | 12/2002 | Kanehira et al. | 474/215 |

FOREIGN PATENT DOCUMENTS

| | | |
|---|---|---|
| JP | 62110045 | 5/1987 |

* cited by examiner

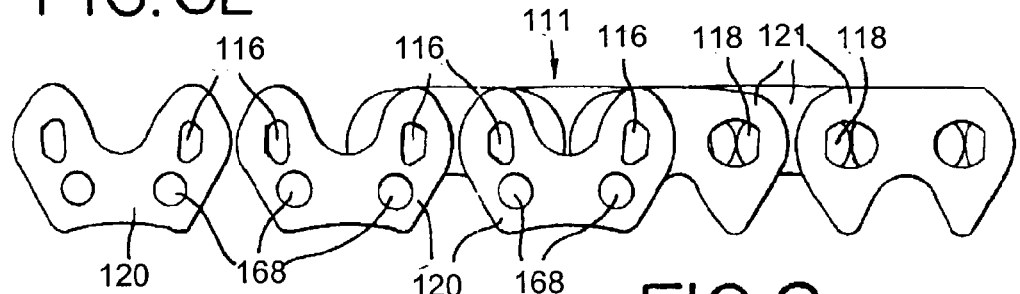
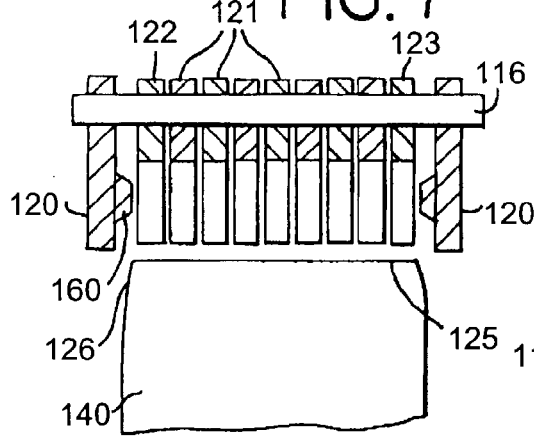
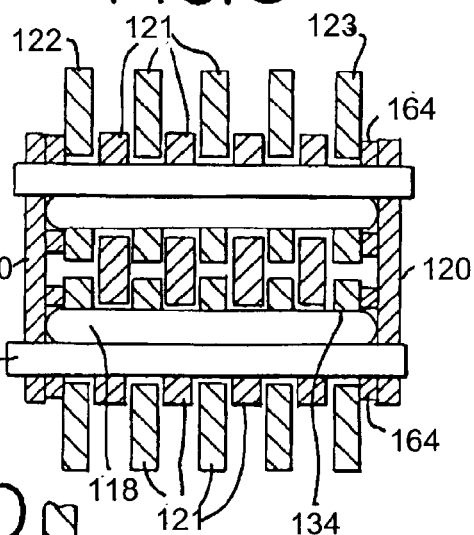
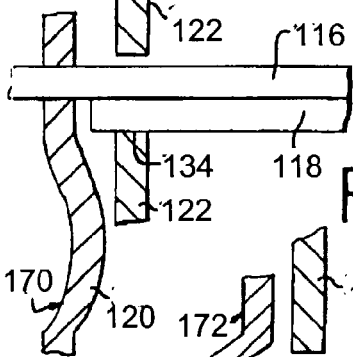
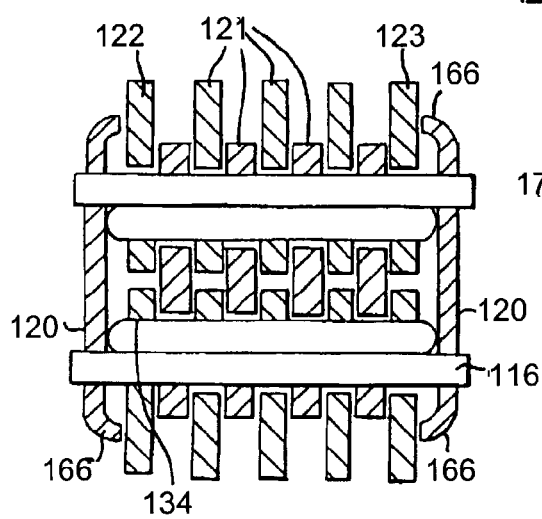
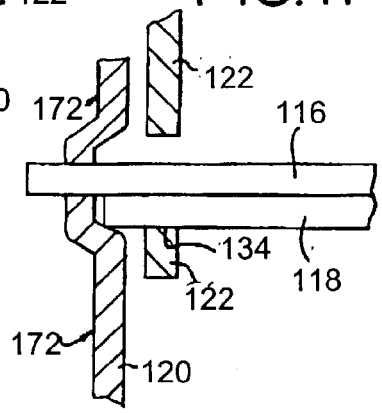

POWER TRANSMISSION CHAIN HAVING LINKS WITH LATERAL SPACING ELEMENTS

REFERENCE TO RELATED APPLICATIONS

This is a continuation-in-part of application Ser. No. 10/132,485, filed Apr. 25, 2002 now U.S. Pat. No. 6,595,882, entitled "Power Transmission Chain Having Links With Lateral Spacing Elements", which is a divisional patent application of application Ser. No. 09/506,349, filed Feb. 17, 2000, entitled "Power Transmission Chain Having Links With Lateral Spacing Elements," now U.S. Pat. No. 6,406,394, which claims benefit from provisional application No. 60/131,413 filed on Apr. 28, 1999. The aforementioned application(s) are hereby incorporated herein by reference.

BACKGROUND OF THE INVENTION

1. Field of the Invention

The invention relates to the field of power transmission chains. More particularly, the invention pertains to a power transmission chain containing spacing elements to increase fatigue strength and decrease incidence of chain strand resonance.

2. Description of Related Art

One aspect of the invention relates to a silent or rocker joint chain, which has links having inverted teeth for engagement with an associated sprocket. Generally, rocker joint chains are used with sprockets for power transmission in transmissions, transfer cases, engine timing systems, and the like. Rocker joint chains are well known in the art. Examples include U.S. Pat. Nos. 5,651,746; 5,345,753; and 5,372,554 which are incorporated herein by reference.

Rocker joint chains are formed by the assembly of rows of links in lateral and longitudinal directions. Each link typically has a pair of teeth and a pair of pin apertures. The links are interlaced and then connected to each other by connecting pins inserted in each pin aperture. Guide links are utilized as the outermost links of the chain to maintain the chain on the sprockets when the chain is wrapped around the sprockets during operation. Guide links may be installed in the center or at both outer edges of the row of link plates arranged in the lateral direction. The guide links are conventionally press fit over pins, which connect the interlaced inside or articulating links. Guide links typically do not include inverted teeth.

Conventionally, a rocker joint is used as the connecting pin. The rocker joint is comprised of a pair of long and short pins. A first short pin, referred to as the rocker, is paired with a second longer pin. The longer pin has both ends fixed to guide links at the outmost flanks of the chain.

Conventional rocker joint chains are limited in the transfer of load between the rocker and the inside links that are positioned at the outermost end of the rocker. The limitation is due to the fact that only partial contact is obtained between these same inside links and the end of the rocker. A separate limitation concerns the contact between the outermost inside links and the sprocket. Due to the required chamfer on sprocket teeth and the axial clearance between the sprocket teeth and chain guide links only partial contact is achieved between the same inside links and the sprocket.

Prior art rocker joint chains showing the disadvantages in conventional chain designs are shown in FIGS. 1–3 and 14. The chain is comprised of rows of links. Alternate rows of links, or guide rows, have guide links press fit on their ends. The remaining rows, or non-guide rows, have inside links as their outermost links.

FIG. 1 shows a prior art rocker joint chain in a side view. Rows of inner links 21 in a guide row 12 alternately interleave with rows of inner links 21 in a non-guide row 14 and held by rocker joints comprising pairs of pins 16 and rockers 18. A guide link 20 is fixed to the each end of the guide row 12 of inner links 21 by pins 16 which extend outwardly from the rows of inside links.

In the prior art rocker joint chain 10, shown in FIG. 2, there is a clearance 30 between the end of the rocker 18 and the guide link 20. This clearance 30 exists because of necessary manufacturing tolerances of the individual rockers 18 so that they are spaced from the guide links 20 after the assembly process. There also exists an end radius 19 on the rocker 18, which is necessary to prevent excessive local stresses in the pin 16 and rocker 18, and also for ease of assembly of the chain 10. The clearance between the rocker 18 and the guide link 20 and the shortening of the rocker as a result of the end radius of the rocker, result in only partial bearing contact between the outermost inside links 22, 23 of the non-guide row, and the rocker. The partial bearing contact limits the load carrying capability of the chain because all of the links are not carrying their full share of the load.

FIG. 3 shows an exaggerated cross section through the chain of the prior art and sprocket 40. The chain 10 is shown slightly out of position, i.e., raised vertically. The limitation in this design is that the contact area between the outermost inside links 22, 23 and sprocket tooth 25 is limited due to the chamfer 26 on the sprocket teeth and the necessary axial clearance between the chain 10 and sprocket 40. Thus, the partial engagement or partial contact occurs between the outermost inside links 22, 23 of the non-guide row and the sprocket.

FIG. 14 shows a conventional rocker joint chain with a centered spring link 32. Spring links are used in chains conventionally, to help control chain strand vibration by increasing the internal friction in the chain. Compression of the centered spring link 32, in the direction shown by the arrow, forces the links in the rows to press against each other causing friction. The compression of the inside links 21 in the non-guide row 14 against the outside guide links 20 could cause a gap great enough that the rocker pin 18 may become disengaged from the outside guide links 20, forcing the non-guide row 14 of inside links 21 apart, resulting in a loss of chain strength.

The present invention also has application to silent chains with round connecting pins. An example of a round pin silent chain is shown in U.S. Pat. No. 4,758,209, which is incorporated herein by reference. While there is no rocker in a round pin chain, the spacing elements, especially when they are spring links, help center the inside links between the guide links. This helps provide full engagement of the inside links with the sprocket teeth, helping to distribute the load between the chain and the sprocket more evenly than in a chain without spacing elements. This affect is also beneficial in a rocker joint chain.

The present invention also has application to chain belts, as shown in U.S. Pat. Nos. 4,580,999 and 5,439,423 which are incorporated herein by reference.

SUMMARY OF THE INVENTION

A chain having a plurality of inside links and guide links. The plurality of inside links each have a pair of apertures and are interleaved and connected to form rows. The plurality of guide links each have a pair of apertures and are placed outside of alternate rows of interleaved inside links to form guide rows. Connecting pins are received in the apertures and extend across the rows of the chain securing the links together. Spacing elements are found on opposite side of the chain, specifically between the guide links and the adjacent outermost inside links. The spacing elements act to maintain a spaced relationship between each of the guide link sand adjacent outermost inside links. At least one of the spacing elements on one side of the chain is a spring link holding the inside links in compressive frictional contact therebetween.

BRIEF DESCRIPTION OF THE DRAWING

FIG. 6E is a longitudinal side view of a portion of a power transmission chain of the present invention showing the guide link side opposite the projections.

FIG. 7 is a sectional end view showing the projections.

FIG. 8 is a sectional view showing the location of the washers.

FIG. 9 is a sectional view showing the curved end elements of the guide links.

FIG. 10 is a partial sectional view showing an embodiment of the curved mid-elements of the guide links.

FIG. 11 is another embodiment of the curved mid-elements.

FIG. 1 shows

DETAILED DESCRIPTION OF THE INVENTION

The present invention addresses the above-described problems by providing in a power transmission chain, in general terms, a spacing element to ensure that there is full engagement of the rocker and the non-guide row of links to increase the fatigue strength of the chain, while keeping the friction present in the chain at a point such that chain strand resonance is prevented. The present invention also allows increased sprocket width providing better contact between the chain and sprocket. The present invention is explained below with reference to the embodiments illustrated by the attached figures.

Figure 1:
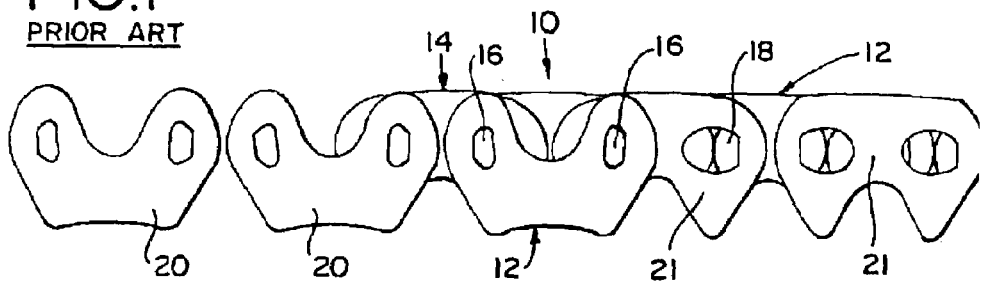
FIG. 1 is a longitudinal side view of a portion of a prior art rocker joint chain.
Figure 2:
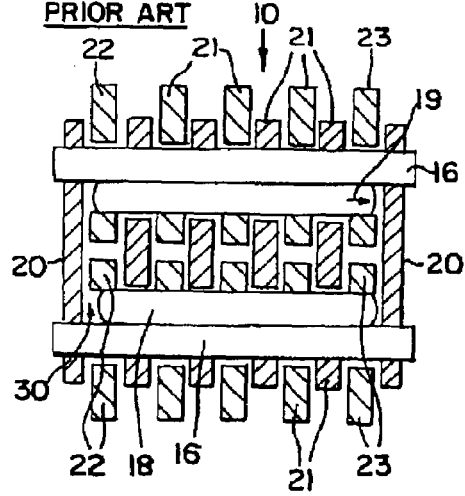
FIG. 2 is a sectional view of a portion of a prior art rocker joint chain.
Figure 3:
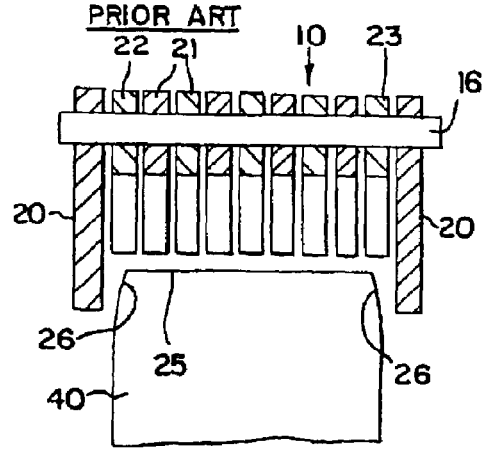
FIG. 3 is a sectional end view illustrating the spacing between the sprocket and guide links in a prior art rocker joint chain.
Figure 4:
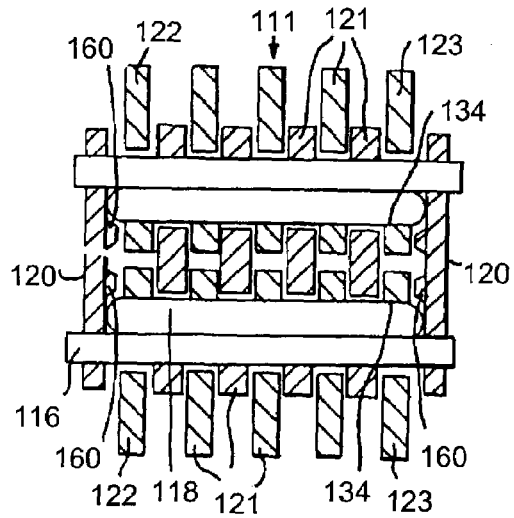
FIG. 4 is a sectional view of the power transmission chain of the present invention showing the projections from the guide links.

FIG. 4 shows a sectional view of a preferred embodiment of a rocker joint chain 111 of the present invention. As in the prior art, the chain is constructed from the assembly of interleaved rows of links. Inside links 121 are flanked by guide links 120 and connected by connecting pins, each comprising a pin 116 and a rocker 118. The guide links 120 and inside links 121 are shown more clearly in FIG. 6E. The inside links shown in FIG. 6E are shown as each having a pair of depending teeth adapted to contact the teeth of an associated sprocket (not shown). It should be understood that other configurations of inner links are contemplated, such as links with a single depending tooth as disclosed in U.S. Pat. No. 5,435,789, incorporated herein by reference.

In the chain of the present invention, the guide links maintain the lateral alignment of the chain on the sprockets. The guide links 120 are located along the outside of the chain, i.e., flanking the outermost inside links 122, 123 and do not have teeth for engagement with the sprocket teeth. The guide link 120 has projections 160 formed on an inner face. The projections 160 bear upon outermost inside links 122, 123 and act to maintain a space between the main body of the guide links 120 and the inside links 122, 121, 123. Complete bearing contact between the rocker 118 and the outermost inside links 122, 123 at surface 134 is provided by virtue of the slight increase in rocker length allowed by the increased space between the guide links 120 and the outermost inside links 122, 123.

Figure 5:
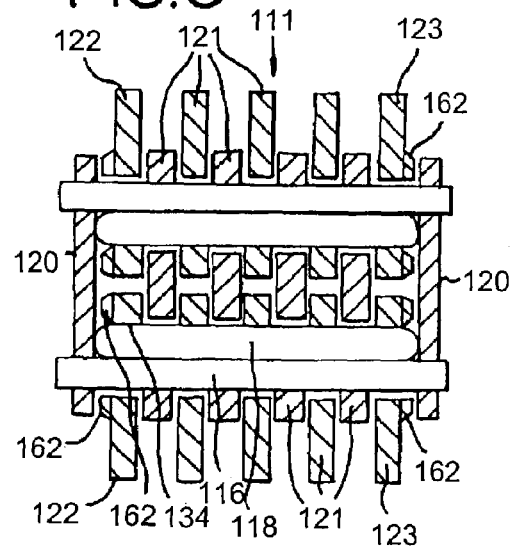
FIG. 5 is a sectional view of the power transmission of the present invention showing an alternate location of the projections.

An alternate embodiment of the present invention shown in FIG. 4 is illustrated in FIG. 5. Projections 162 are formed on the outside face of the outermost inside links 122, 123. Each projection 162 serves the same function as projection 160 in FIG. 4, i.e., which is to space apart the inside links 121, 122, 123 from the guide links 120 to provide increased axial clearance. While operating like the embodiment shown in FIG. 4, the present embodiment requires the manufacture of three different link types as opposed to two.

Figure 6A:
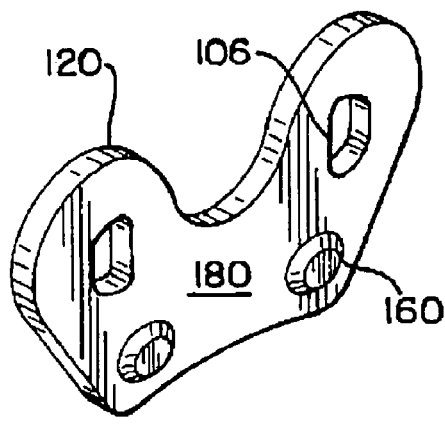
FIG. 6A is a perspective view of the inside face of the guide link with two projections.
Figure 6B:
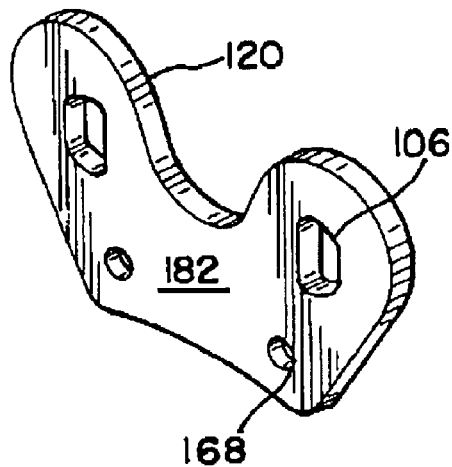
FIG. 6B is a perspective view of the outside face of the guide link with two projections.

FIGS. 6A and 6B show an inside and outside view respectively of one embodiment of a guide link of the present invention. Guide link 120 has a pair of projections 160 on an inside surface 180 of the link plate. The projections 160 are located below the guide link plate apertures 106. The corresponding recesses or locations 168 are shown on the outside surface 182 of the guide link 120.

Figure 6C:
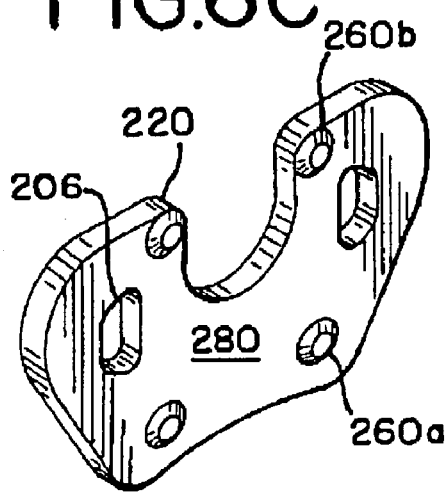
FIG. 6C is a perspective view of the inside face of the guide link with four projections.
Figure 6D:
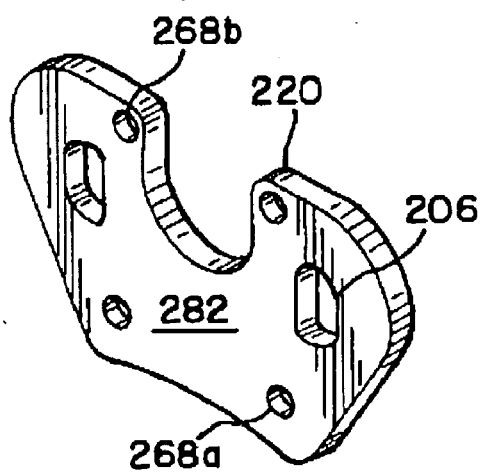
FIG. 6D is a perspective view of the outside face of the guide link with four projections.

FIGS. 6C and 6D show an inside and outside view respectively of another embodiment of a guide link of the present invention. Guide link 220 has two pair of projections 260a, 260b on an inside surface 280 of the link plate. The projections 260a are located below the guide link plate apertures 206, and the projections 260b are located above the guide link plate apertures 206. Note that the top of the guide link has been widened above each aperture to allow space for both the aperture and the projection. The corresponding recesses or locations 268a, 268b are shown on the outside surface 282 of the guide link 220.

FIG. 6E shows one embodiment of the location 168 of the projections 160 formed into the guide links 120 shown in FIG. 4 and FIGS. 6A and 6B. However, the projections 160 can be located in any portion of the guide link which allows contact with the outermost inside links 122, 123 and provides the desired axial spacing. The projections 160 can be formed by various methods including pressing, stamping, molding, machining or the like. Location 168 may also correspond to a recess or dimple formed on the outer face of the guide link 120 when creating the projections on the inner face of the guide link 120 by a stamping process.

FIG. 7 shows a preferred embodiment of the chain and sprocket in cross section. Projections 160 are shown on guide links 120, which bear upon outermost inside links 122, 123. With the additional axial space created by the projections 160, the sprocket 140 width can be increased to assure full contact with all the inside links 121 including the outermost inside links 122, 123. The additional contact will reduce wear and contact stress between the chain and sprockets, which may in turn allow substitution of lower cost materials or processes for the sprocket, reducing overall system cost.

FIG. 8 illustrates another embodiment of the present invention. A washer 164 encircles the rocker joint between the guide links 120 and the inside links 121. The rocker 118 and the outermost inside links 122, 123 are in full contact at surface 134 due to the increased length of the rocker 118 allowed by increased clearance in the axial direction. The washer 164 need not be integral with the guide links or the inside links.

In FIG. 9 guide links 120 have curved end elements or portions 166 located at each of the distal ends of the guide link 120. Each curved end portion 166 extends inwardly toward the adjacent outermost inside link. The desired axial spacing is maintained by the curved end portions 166 bearing upon the outer face of the outermost inside links 122, 123.

FIGS. 10 and 11 illustrate in a simplified partial view alternate embodiments of the curved end portions 166 of FIG. 9. Curved mid-portions 170, 172 are portions of the guide link 120 which deviate from the typical flat plate-like guide link shape of the prior art. The curved mid-portions 170, 172 are located in the midsection of the guide link 120 and serve to maintain a space between the guide link 120 and an adjacent outmost inside link 122. An identical curved guide link 120 with a curved mid-portion 170 or 172 would be placed on the opposite side of the chain.

Figure 12:
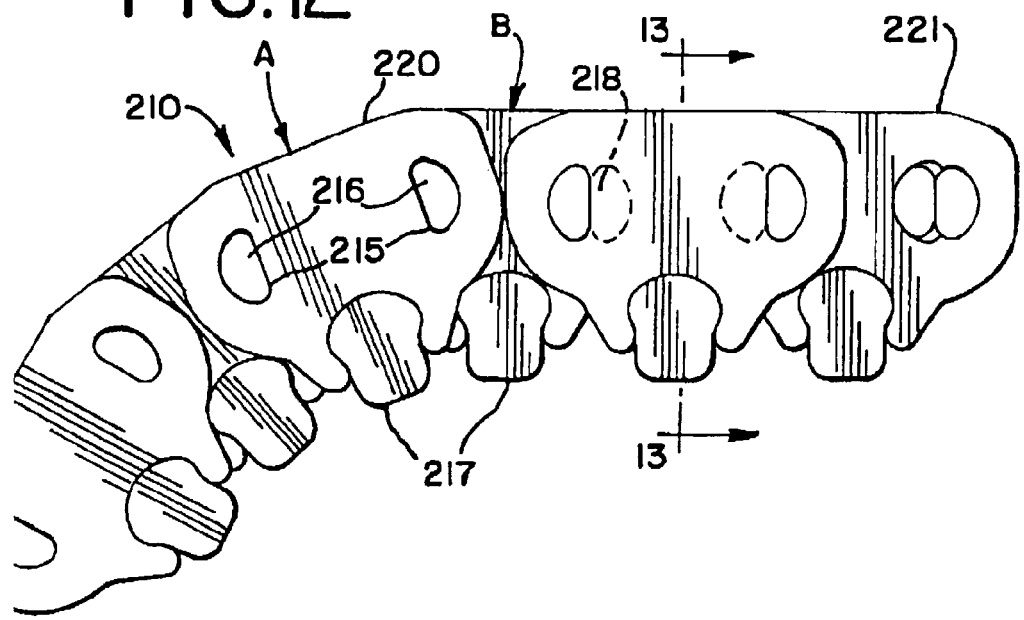
FIG. 12 is a side view of a chain belt.
Figure 13:
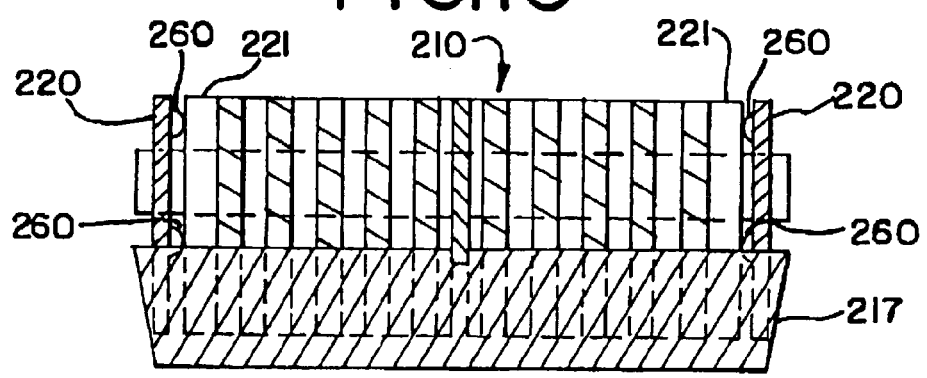
FIG. 13 is a sectional view of the chain belt of FIG. 12 with spacing elements.

FIGS. 12 and 13 illustrate a power transmission chain belt 210. Generally, as shown in FIG. 12, the chain belt includes links arranged in sets A and B which are interleaved or "laced" with one another. A "set" of links are those links which are grouped transversely together; at times a set of links is referred to as a "rank." Each link is provided with a pair of apertures 215, each aperture being adjacent to an end of the link plate, with the apertures in a set being aligned with one another. When interlaced with other sets of links, the apertures 215 at one end are transversely aligned with those in the interleaved set, so that the connecting pin interconnects the interlaced links. The connecting pin typically includes a rocker 218 and a pin member 216. The pin member 216 extends through and is press fit to the apertures of the outermost link plates 220 which are located on the flanks of alternate sets of links. The rocker 218 extends through the apertures of the remaining links, at times referred to as the inside links 221, stopping short of the outermost or guide links 220. Struts 217 for engaging a pulley transmission (not shown) are provided to the chain either positioned in a passageway defined by toes which depending from each link or wrapped around the chain. Load blocks (not shown) may be wrapped about the chain to engage a pulley transmission.

As shown in FIG. 13, spacing elements or members 260 are applied to inside faces of the guide links 220. The benefit of spacing elements as applied to a chain type belt is directed to the increase in contact area between the rocker pin and the outermost inside link aperture.

Figure 14:
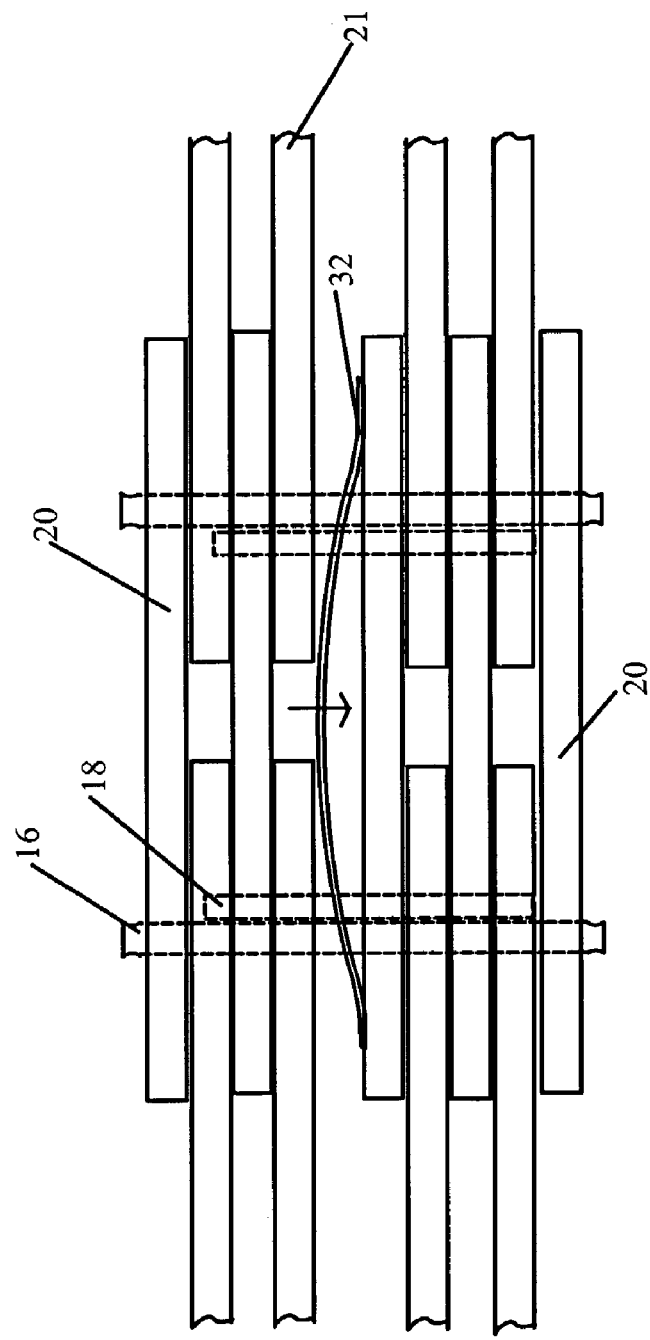
FIG. 14 shows top down view of a prior art rocker joint chain with a centered spring link.
Figure 15A:
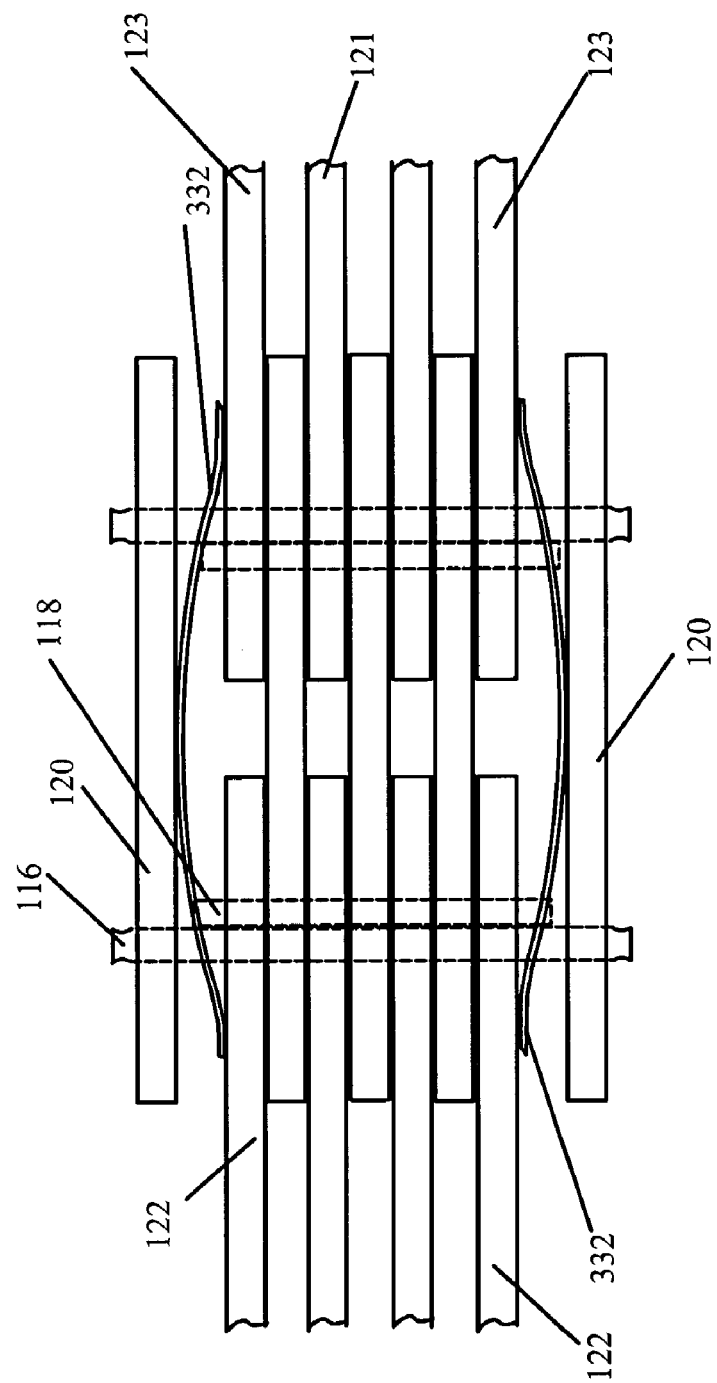
FIG. 15A shows a top down view of another embodiment in which a pair of spring links in one configuration are used as spacing elements.
Figure 15B:
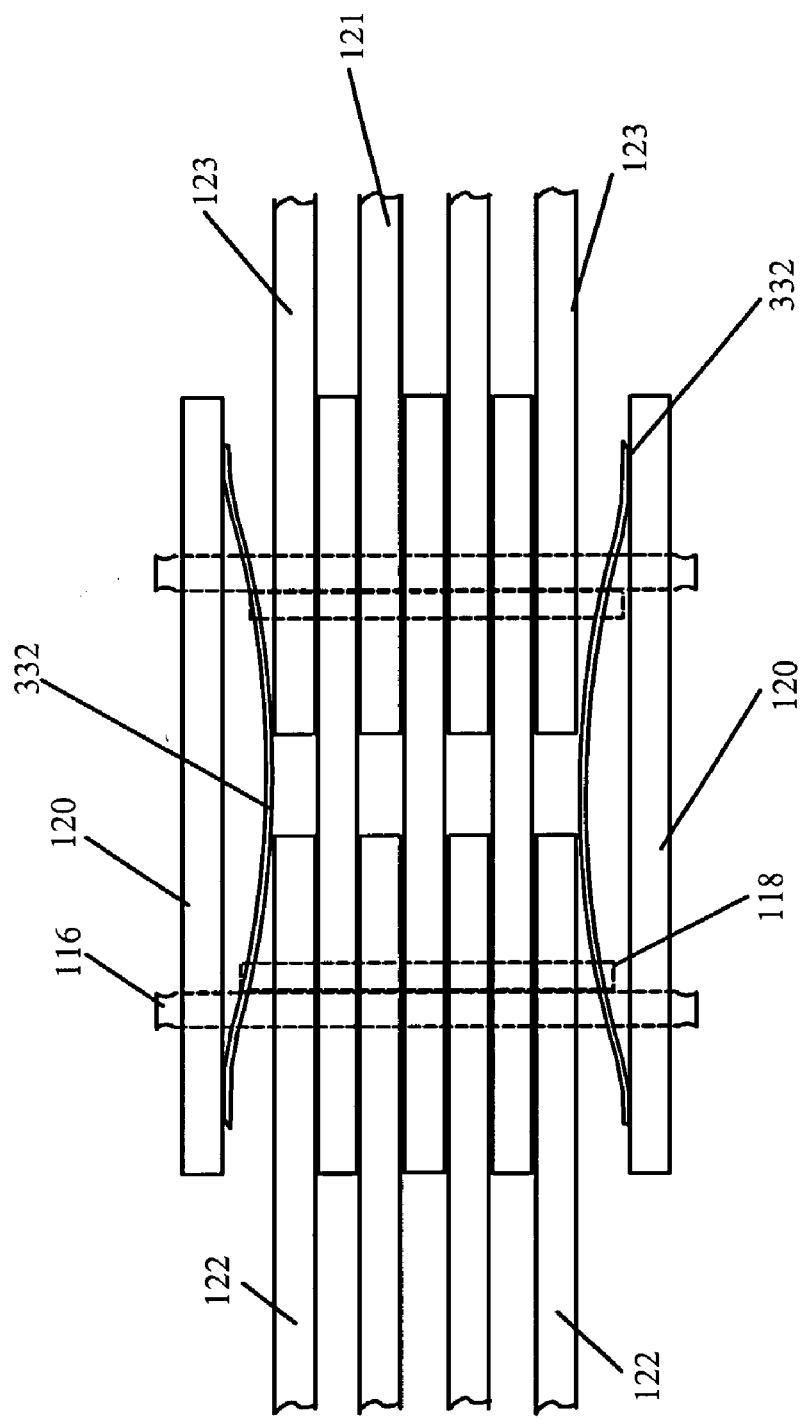
FIG. 15B shows a top down view of another embodiment in which a pair of spring links in a different configuration are used as spacing elements than that shown in FIG. 15A.
Figure 17A:
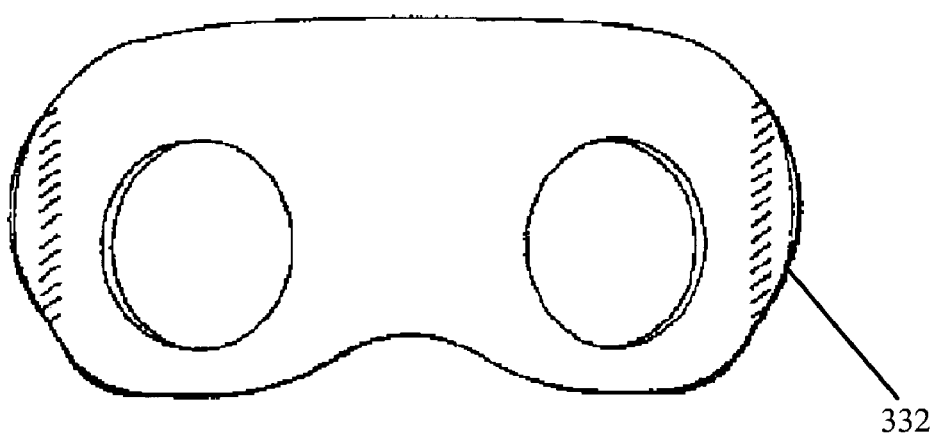
FIGS. 17A and 17B show a side view and top view from the chain point of view of an example of a spring link used in the present invention.
Figure 17B:
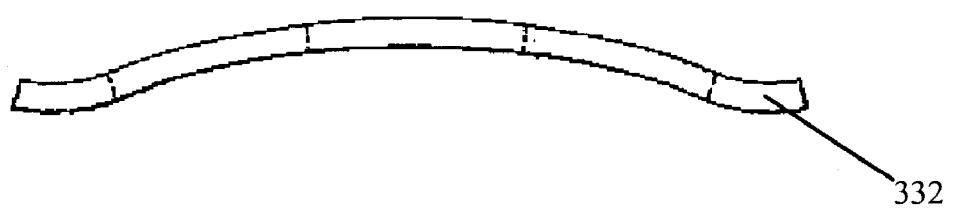

FIG. 15A shows another alternative embodiment of the present invention in which a pair of separated spring links 332 are used as spacing elements. A front and side view of an example of a spring link 332 that may be used in the embodiment are shown in FIGS. 17A and 17B. As in the other embodiments of the present invention, the chain is constructed from an assembly of interleaved rows of links. Inside links 121 are flanked by guide links 120 and connected by connecting pins, each comprising a pin 116 and a rocker 118. The guide links 120 are located along the outside of the chain, i.e., flanking the outermost inside links 122, 123 and do not have teeth for engagement with the sprocket teeth. A pair of spring links 332 are used as spacing elements between the non-guide row 114 of the outermost inside links 122, 123 and the row of outside guide links 120. The springs links 332 are arranged such that the ends of the spring links are in contact with the inside links. As in the other embodiments of the present invention, the spacing element provides an increased amount of space, allowing for a longer rocker pin, which will not cause a gap event as in prior art FIG. 14. In this case the spacing element is a spring link. Unlike in the prior art, the inside links 121 in the non-guide rows 114 are not compressed in such a fashion as to allow the rocker pin 118 to become disengaged from the inside links 121. Thus, the spring links 332 provide a spacing element between the outside guide links 120 and the inner links 121 in non-guide rows 114 and also increases the internal friction in the chain helping to control chain strand vibration. FIG. 15B shows an alternative configuration of the above embodiment. The spring links 332 in this configuration perform the same function as in FIG. 15A, but are rotated 180°, such that the ends of the spring links are in contact with the guide links.

Figure 18A:
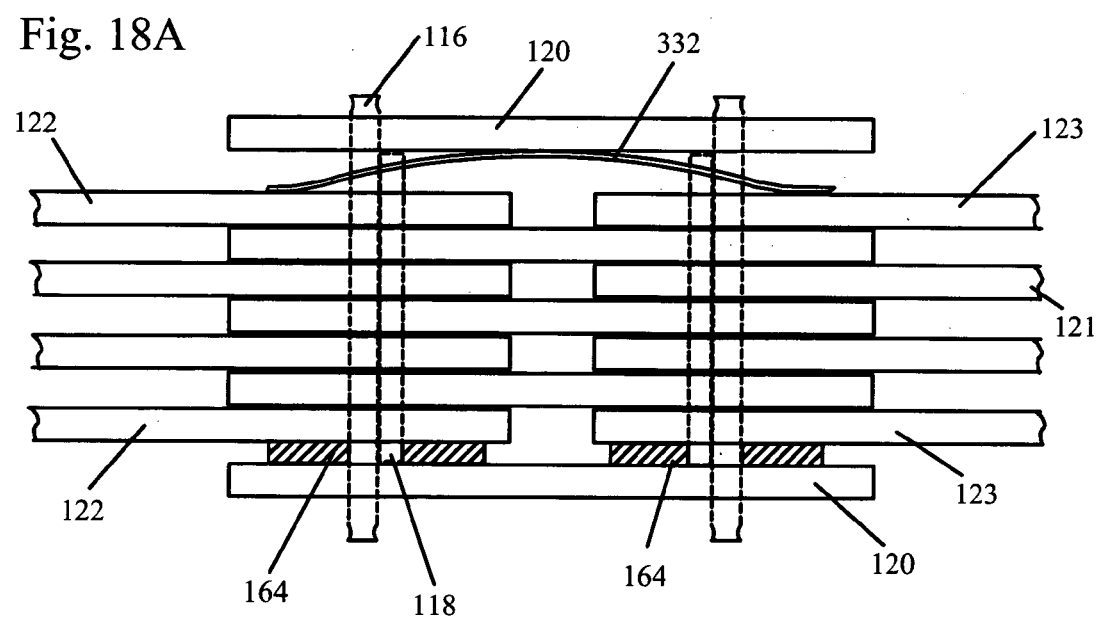
FIGS. 18A and 18B show additional embodiments.
Figure 18B:
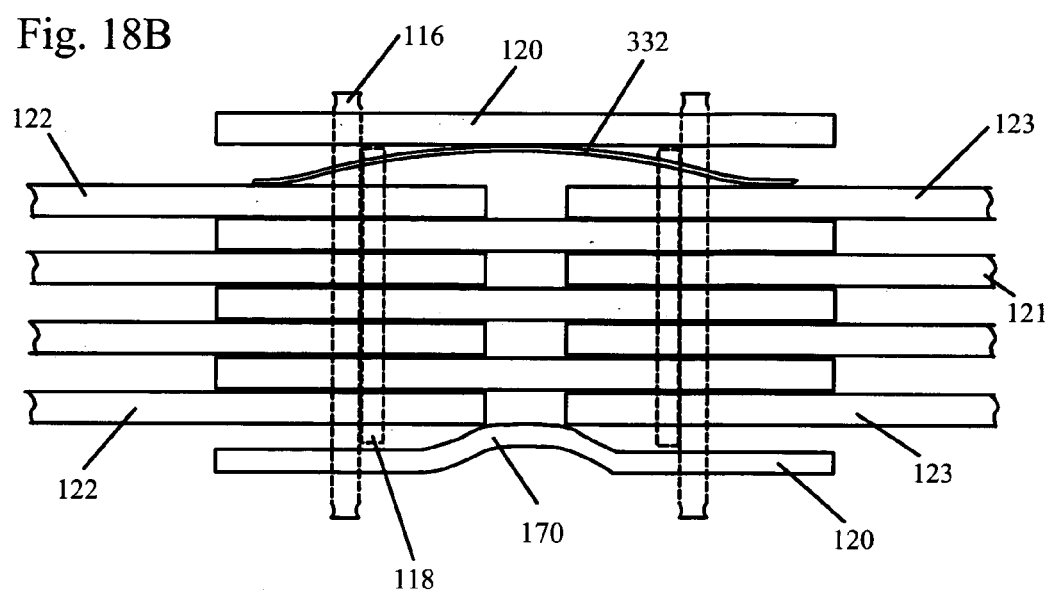

Additional embodiments (similar to that of FIG. 15A) include the use of one spring link and one chain washer, or one spring link and one curved mid-portion of a guide link, as shown in FIGS. 18A and 18B.

Figure 16:
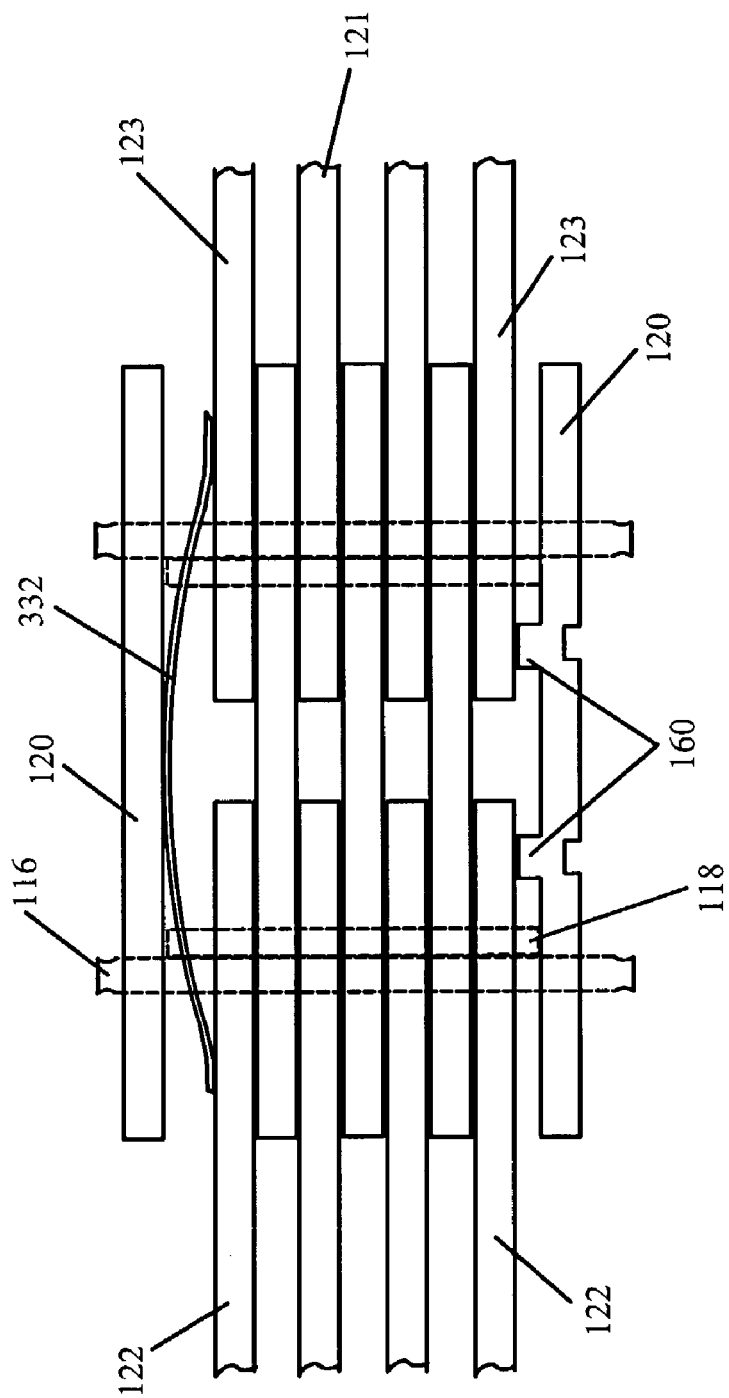
FIG. 16 shows a top down view of an alternative embodiment of the present invention.

FIG. 16 shows another embodiment of the present invention. In this embodiment, one spring link 400 is placed on one side of the chain between the non-guide row 114 of inside links 121 and the outside guide links 120. On the other side of the chain is an outside guide link 120 that has a pair of projections 160 on an inside surface 180 of the link plate 120. The projections 160 are located below the guide link plate apertures 106. The corresponding recesses or locations 168 are shown on the outside surface 182 of the guide link 120. However, the projections 160 may be located in any portion of the guide link which allows contact with the outermost inside links 122, 123, and provides the desired axial spacing. The projections 160 may be formed by various methods including pressing, stamping, molding, machining or the like. The combination of the spring link 400 and the projections 160 ensures that the rocker pin 118 protrudes completely through the outermost non-guide row 114 links 122, 123 lending full support to the chain.

The spacing thus provided between the guide link and the inside links allows the rocker to contact against the entire bearing surface of the aperture of the outermost inside link. In addition, the spacing provides complete engagement of all the inside links with the entire width of the sprocket. Minimizing the clearance between the rocker and guide link serves to lessen the amount of rocker movement and helps to maintain the stated advantages.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A power transmission chain comprising:
   a plurality of interleaved inside links, each of the inside links having a pair of apertures, the inside links being interleaved and connected into a series of non guide rows;
   a plurality of guide links, each of the guide links having a pair of apertures, the guide links being placed outside of alternate rows of interleaved inside links to form guide rows;
   connecting pins comprising a rocker pin and a second pin received in the apertures, the rocker pin extending across the rows of all of the inside links, and the second pin extending across the rows of the chain and having ends secured within the apertures of the guide links thereby connecting the inside links and the guide links;
   spacing elements on opposite sides of the chain, located between the guide links and an adjacent outermost inside link, the spacing elements acting to maintain a spaced relationship between each guide link and outermost adjacent inside links, into which the rocker pin extends;
   wherein at least one of the spacing elements being a spring link spanning a first set and a second set of connecting pins, the first set of connecting pins associated with a first outermost inside link and a second set of connecting pins associated with a second outermost inside link, for holding the inside links in compressive frictional contact therebetween and wherein the rocker pin extends fully through the apertures of the outermost inside links in the non guide row into the spaced relationship between the guide links and the outermost adjacent inside links to provide full support of the outermost inside links.

2. The power transmission chain of claim 1, wherein the spacing elements on both opposite sides of the chain are spring links.

3. The power transmission chain of claim 1, wherein one of the spacing elements is a spring link and the spacing element on the opposite side of the chain is a washer.

4. The power transmission chain of claim 1, wherein one of the spacing elements is a spring link and the spacing element on the opposite side of the chain are a plurality of protruding members formed on an outer face of the adjacent outermost inside link, projecting toward the guide links.

5. The power transmission chain of claim 1, wherein one of the spacing elements is a spring link and the spacing element on the opposite side of the chain are a plurality of protruding members formed on an inner face of the guide links, projecting toward the adjacent outermost inside link.

6. The power transmission chain of claim 1, wherein one of the spacing elements is a spring link and the spacing element on the opposite side of the chain are curved mid-portions of the guide links.

7. The power transmission chain of claim 1, wherein the spacing elements maintain a space between the guide links and the outermost inside links.

8. The power transmission chain of claim 1, wherein the second pin is press fit into the apertures of the guide links.

9. The power transmission chain of claim 8, wherein the second pin is round.

10. An improved power transmission chain of the type in which a plurality of interleaved inside links, each of the inside links having a pair of apertures, the inside links being interleaved and connected into a series of non guide rows, a plurality of guide links, each of the guide links having a pair of apertures, the guide links being placed outside of alternate rows of interleaved inside links to form guide rows, and connecting pin comprising a rocker pin and a second pin, received in the apertures, the rocker pin extending across the rows of all of the inside links, and the second pin extending across the rows of the chain and having ends secured within the apertures of the guide links, thereby connecting the inside link and the guide links, wherein the improvement comprises:
    spacing elements on opposite sides of the chain, located between the guide links and an adjacent outermost inside link, the spacing elements acting to maintain a spaced relationship between each guide link and outermost adjacent inside links, into which the rocker pin extends;
    wherein at least one of the spacing elements being a spring link spanning a first set and a second set of connecting pins, the first set of connecting pins associated with a first outermost inside link and a second set of connecting pins associated with a second outermost inside link, for holding the inside links in compressive frictional contact therebetween and wherein the rocker pin extends fully through the apertures of the outermost inside links in the non guide row into the spaced relationship between the guide links and the outermost adjacent inside links to provide full support of the outermost inside links.

11. The improved power transmission chain of claim 10, wherein the spacing elements on both opposite sides of the chain are spring links.

12. The improved power transmission chain of claim 10, wherein one of the spacing elements is a spring link and the spacing element on the opposite side of the chain is washer.

13. The improved power transmission chain of claim 10, wherein one of the spacing elements is a spring link and the spacing element on the opposite side of the chain are a plurality of protruding members formed on an outer face of the adjacent outermost inside link projecting toward the guide links.

14. The improved power transmission chain of claim 10, wherein one of the spacing elements is a spring link and the spacing element on the opposite side of the chain are a plurality of protruding members formed on an inner face of the guide links projecting toward the adjacent outermost inside links.

15. The improved power transmission chain of claim 10, wherein one of the spacing elements is a spring link and the spacing element on the opposite side of the chain are curved mid-portions of the guide links.

16. The improved power transmission chain of claim 10, wherein the spacing elements maintain a space between the guide links and the outermost inside links.

17. The improved power transmission chain of claim 10, wherein the second pin is press fit into the apertures of the guide links.

* * * * *